US010297934B2

(12) United States Patent
Hai et al.

(10) Patent No.: US 10,297,934 B2
(45) Date of Patent: May 21, 2019

(54) EXPANDABLE BLADE-TYPE DISTRIBUTION BLOCK

(71) Applicant: Edge Holdings, LLC, Phoenix, AZ (US)

(72) Inventors: Wang Hai, Ningbo (CN); Larry Vansickel, Phoenix, AZ (US); Zhou Liang, Ningbo (CN)

(*) Notice: Subject to any disclaimer, the term of this patent is extended or adjusted under 35 U.S.C. 154(b) by 0 days.

(21) Appl. No.: 15/483,869

(22) Filed: Apr. 10, 2017

(65) Prior Publication Data

US 2018/0159251 A1 Jun. 7, 2018

(30) Foreign Application Priority Data

Dec. 7, 2016 (CN) .......................... 2016 1 1113598

(51) Int. Cl.
| H01R 9/24 | (2006.01) |
| H01R 4/42 | (2006.01) |
| H01H 85/20 | (2006.01) |
| H01R 31/08 | (2006.01) |
| H01R 13/68 | (2011.01) |

(52) U.S. Cl.
CPC ............. *H01R 9/245* (2013.01); *H01H 85/20* (2013.01); *H01H 85/2035* (2013.01); *H01R 4/42* (2013.01); *H01R 9/2408* (2013.01); *H01R 31/08* (2013.01)

(58) Field of Classification Search
CPC ....... H01R 4/42; H01R 9/245; H01H 85/2035
USPC ......... 439/620.26, 620.33, 797, 801, 620.23, 439/620.27, 717, 716
See application file for complete search history.

(56) References Cited

U.S. PATENT DOCUMENTS

| 4,280,748 | A | * | 7/1981 | McHenney | ............ | H01R 13/68 439/620.26 |
| 4,391,485 | A | * | 7/1983 | Urani | ................. | H01H 85/2035 337/198 |
| 4,722,701 | A | | 2/1988 | Bradt | | |
| 5,014,163 | A | * | 5/1991 | Lin | ........................... | G06F 1/18 361/791 |
| 5,035,653 | A | * | 7/1991 | Honkomp | .............. | H01R 13/68 439/620.33 |
| 5,295,870 | A | * | 3/1994 | Rei | ...................... | H01R 13/514 439/715 |
| 5,328,392 | A | * | 7/1994 | Lin | ...................... | H01H 85/203 439/620.27 |

(Continued)

*Primary Examiner* — Abdullah A Riyami
*Assistant Examiner* — Nelson R. Burgos-Guntin
(74) *Attorney, Agent, or Firm* — Keith L. Jenkins, Registered Patent Attorney, LLC; Keith L. Jenkins (57) ABSTRACT

A distribution block element having opposed input and output couplings and integral complimentary mechanical connectors to additional adjacent distribution block elements, allowing expansion by addition of distribution block elements. Fuse couplings are spaced apart for a mini2 blade fuse and have a length that is are spaced apart for a maxi APX heavy duty fuse and for direct conductors. When two elements are connected adjacently, the spacing between the adjacent crossbar couplings is the same as the spacing between the opposed input and output fuse couplings in each element. Thus, identical crossbar conductors can be used both for electrically connecting opposed input and output couplings and for electrically connecting input couplings of adjacent elements.

20 Claims, 4 Drawing Sheets

(56) References Cited

U.S. PATENT DOCUMENTS

| | | | | |
|---|---|---|---|---|
| 5,618,209 A * | 4/1997 | Lin | H01H 85/205 | 439/620.26 |
| 6,004,159 A * | 12/1999 | Liang | H01R 11/22 | 439/620.27 |
| 6,004,166 A * | 12/1999 | Cardas | H01R 27/02 | 439/781 |
| 6,022,247 A | 2/2000 | Akiyama et al. | | |
| 6,030,257 A * | 2/2000 | Furuya | H01H 85/2045 | 439/620.26 |
| 6,162,097 A * | 12/2000 | Liang | H01H 85/202 | 439/218 |
| 6,293,830 B1 * | 9/2001 | Park | H01R 9/26 | 439/709 |
| 6,817,907 B2 * | 11/2004 | Cheng | H01R 25/006 | 439/620.26 |
| 6,878,004 B2 | 4/2005 | Oh | | |
| 7,488,213 B2 * | 2/2009 | Plummer | H01H 11/0031 | 439/620.33 |
| 7,892,032 B2 * | 2/2011 | Pizzi | H01R 13/68 | 439/620.33 |
| 2001/0027060 A1 * | 10/2001 | Kondo | H01H 85/24 | 439/620.27 |
| 2002/0067279 A1 * | 6/2002 | Torrez | H01H 85/306 | 340/638 |
| 2003/0003807 A1 * | 1/2003 | Beer | H01H 9/085 | 439/620.26 |
| 2003/0020589 A1 * | 1/2003 | Scoggin | H01H 85/547 | 337/186 |
| 2003/0032332 A1 * | 2/2003 | Liang | H01H 85/2035 | 439/620.27 |
| 2004/0166737 A1 * | 8/2004 | Cheng | H01H 85/205 | 439/620.26 |
| 2006/0119463 A1 * | 6/2006 | Kubota | H01H 85/2035 | 337/182 |
| 2008/0191550 A1 * | 8/2008 | Parnis | H01R 13/68 | 307/9.1 |
| 2013/0040494 A1 * | 2/2013 | Mische | H05K 1/0263 | 439/620.26 |
| 2013/0095696 A1 * | 4/2013 | Matsumura | H01H 85/044 | 439/620.26 |
| 2016/0064887 A1 * | 3/2016 | Ishikawa | H01H 85/044 | 264/138 |

* cited by examiner

EXPANDABLE BLADE-TYPE DISTRIBUTION BLOCK

RELATED APPLICATION

The present invention claims the benefit, under the Paris Treaty, of Chinese patent application serial number 201611113598.0 filed on Dec. 7, 2016 to two common inventors.

FIELD OF ART

The present invention relates to an expandable blade-type distribution block for distributing electrical power through direct and fused connections. The present invention more particularly relates to blade fuse distribution blocks made of one or more identical discrete elements that are mechanically and electrically connectable to expand the distribution block.

BACKGROUND OF THE INVENTION

Distribution blocks of conventional design include single blocks of fixed size with a plurality of electrical connections for electrical inputs and outputs. Some fused distribution blocks provide a frame or housing within which more or fewer fuses or conductors may be installed, but which are not expandable beyond the frame or housing. Blade-type fuses are predominantly used in the automotive industry, and there are nearly as many different blade-type fuse blocks as there are models of automobiles. As a result, automotive parts and maintenance suppliers must stock a large number of different distribution blocks, at substantial cost.

What is needed is a distribution block that is variable in size and interconnect ability to adapt to a wide variety of applications and that requires stocking of only a few parts, from which many useful distribution blocks can be made.

SUMMARY OF THE INVENTION

Briefly described, the invention includes discrete elements, each of which is mechanically interconnectable to other such discrete elements by at least one integral mechanical connector. Each element may receive and fasten one input and one output conductor at respective input and output coupling on opposed ends of each element. The input and output couplings are identical mirror images of each other, and so may used interchangeably. Between the input and output blocks each element may receive either a blade-type metal electrical conductor or various sizes of blade-type fuses. The elements are dimensioned such that the blade-type metal electrical conductor can also be used to electrically connect adjacent mechanically connected elements. The advantages of the present invention include unrestricted expansion size, adaptability to different gauges of input and output wires, the same conductors may be used for conductors along and between elements, useful for a wide variety of blade-type fuses, or a blade-type conductor through the same element, compact housing, single-element design across multiple applications, and multiple independent circuits in one block.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
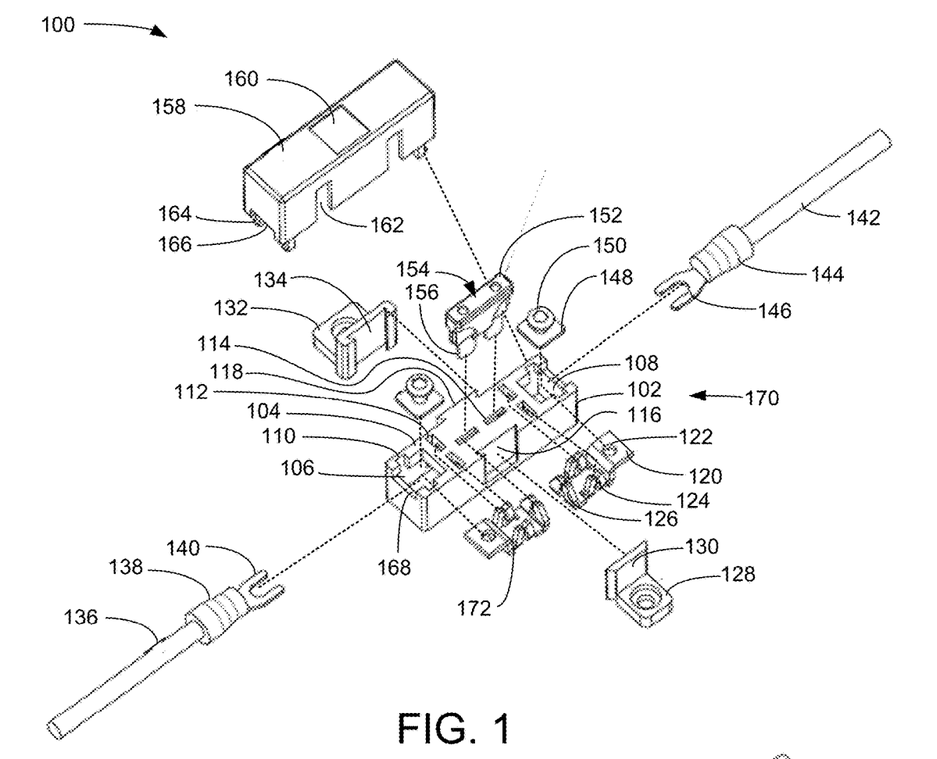
FIG. 1 is an exploded perspective view illustrating an exemplary embodiment of an expandable blade-type distribution block, according to a preferred embodiment of the present invention.

FIG. 1 is an exploded perspective view illustrating an exemplary embodiment of an expandable blade-type distribution block 100, according to a preferred embodiment of the present invention. Expandable blade-type distribution block 100 includes a single element 170 which includes a base 102, an input coupling 172, and an opposed output coupling 120. The base 102 is made of an electrically non-conductive material, has two long parallel opposing sides, and has a top surface 104, which has input and output openings 106 and 108 at opposing ends for accessing input coupling 172 and an opposed output coupling 120. Base 102 has an end notch 168 (one of two labeled) at each end for assisting in accommodating input wire connector 140. Input and output openings 106 and 108 have notches 110 for receiving snap-fit connectors 164 of snap-fit cap 158. Top surface 104 also has crossbar openings 112 (one of four labeled) for receiving blade-type crossbar connectors 302, 306 (see FIG. 3), also known as "coppers"; and fuse blade openings 114 (one of two labeled) for receiving blades 156 (one of two labeled) of a blade-type fuse 152. Fuse blade openings 114 are spaced apart by and amount that allows mounting very small blade fuses 152, for non-limiting example, micro2 blade fuses 510 (see FIG. 5). Fuse blade openings 114 are long enough to allow mounting very large fuses 152, for non-limiting example, maxi APX heavy duty fuses 502 (see FIG. 5). Accordingly, intermediate sized fuses 152, such as low-profile mini APS fuses 508, mini APM/ATM fuses 506, or regular ATC/ATO/ATS fuses 504 can be mounted through openings 114.

Base 102 has, on a first long side, a first mechanical fastener portion 116, exemplified here as a dovetail cavity 116, that is of one piece with the base 102. The opposing long side has a second mechanical fastener portion 118, exemplified here as a dovetail extension 118, which is also of one piece with base 102. First and second mechanical fastener portions 116, 118 are complimentary and fit together to attach either adjacent bases 102 of additional expandable blade-type distribution blocks 100, or to environmental surface fastener holders 128 and/or 132. In various embodiments, more than one pair of first and second mechanical fastener portions 116, 118 may be used. Environmental surface fastener 128 has an extension 130 that fits to first mechanical fastener portion 116. Environmental surface fastener 132 has an extension 134 that fits to second mechanical fastener portion 118. Base 102 attaches to input coupling 172 and to output coupling 120. In a particular embodiment, the attachment between base 102 and couplings 172 and 120 is a releasable attachment.

Snap-fit cap 158 has a window 160 through which the top surface 154 of fuse 152 may be identified and inspected. Window 160 is preferably transparent but may, in various embodiments, be open. In a particular embodiment, window 160 may be large enough to enable pulling the fuse 152 out through the window 160. The internal height of snap-fit cap 158 is sufficient for mounting maxi APX heavy duty blade fuses 502. In a particular embodiment, snap-fit cap 158 may have an internal height adapted to low-profile mini blade fuses 508. Snap-fit cap 158 has two crossbar openings 162 (one of two labeled) on each long side for accommodating crossbar conductors 306 and 302 (see FIG. 3). Preferably, snap-fit cap 158 has four snap-fit couplings 164 (one of three visible labeled) that fit in notches 110 (one of four labeled). In various embodiments, other approaches to fastening cap 158 to base 102 may be used. Snap-fit cap 158 aligns with base 102 to cover the top of first mechanical fastener portion 116, but does not cover second mechanical fastener portion 118. In this way, multiple adjacent elements 170 can be connected with snap-fit caps 158 installed. Snap-fit cap 158 has an end notch 166 at each end of snap-fit cap 158, to assist in accommodating input wire connector 140.

The input coupling 172, and an opposed output coupling 120, mount in base 102 at opposed ends of base 102. Input coupling 172 and output coupling 120 are electrically conductive blocks and each has two blade-type crossbar conductor blade receivers 124 (one of three labeled) and one blade-type fuse blade receiver 126 (one of two labeled), which are preferably of one piece with each input coupling 172 and output coupling 120. When the input coupling 172 is mounted in base 102, its two blade-type crossbar conductor blade receivers 124 (one of three labeled) align with crossbar openings 112 (one of two labeled) and its one blade-type fuse blade receiver 126 (one of two labeled) aligns with opening 114 (one of two labeled). Fastening plateau 310 (see FIG. 3) of input coupling 172 is positioned below opening 106 to receive input wire connector 140. Output coupling 120 is similarly mounted at the opposing end of the base 102, with its fastening plateau 310 (see FIG. 3) positioned below opening 108 to receive output wire connector 146.

Input wire 136 is preferably an insulated electrically conductive wire 136 attached to input wire connector 140 by crimping, soldering, or both. The attachment is covered by an insulating boot 138. Output wire 142 is preferably an insulated electrically conductive wire 142 attached to output wire connector 146 by crimping, soldering, or both. The attachment is covered by an insulating boot 144. To attach input wire 136, input wire connector 140 is placed flat on the fastening plateau 310 (see FIG. 3) of input coupling 172 and aligned around fastener receiving portion 122 (one of two labeled), exemplified as a threaded bore. Next washer 148 is placed on input wire connector 140 with a central opening of the washer 148 aligned to fastener receiving portion 122 (one of two labeled). Fastener 150 (one of two labeled), exemplified here as an Alan screw 150, is coupled to fastener receiving portion 122 through washer 148 and between prongs of input wire connector 140. The connection of output wire connector 146 to output coupling 120 is in the same manner.

Figure 2:
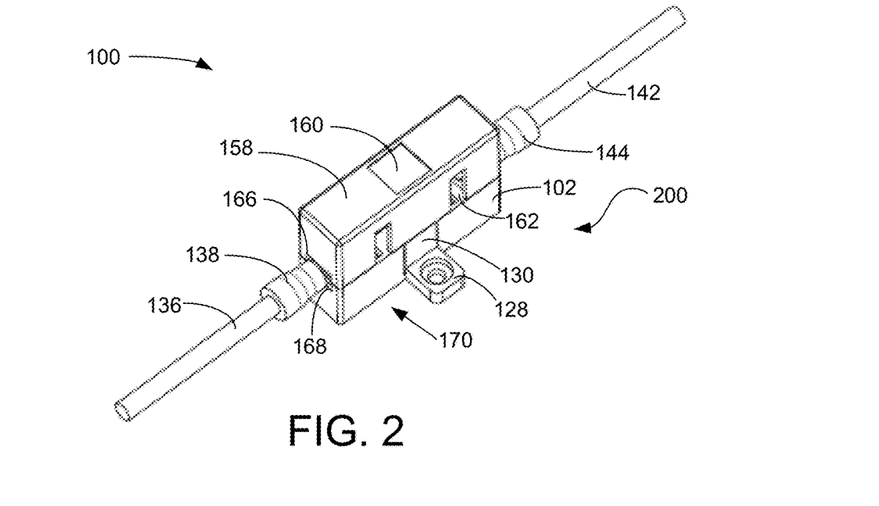
FIG. 2 is a top-front perspective view illustrating the exemplary embodiment of the expandable blade-type distribution block of FIG. 1, according to a preferred embodiment of the present invention.

FIG. 2 is a top-front perspective view illustrating the exemplary embodiment of the expandable blade-type distribution block 100 of FIG. 1, according to a preferred embodiment of the present invention. Expandable blade-type distribution block assembly 200 includes element 170 with input wire 136, output wire 142, washers 148, fasteners 150, blade-type fuse 152, environmental surface fastener holders 128 and 132, and snap-fit cap 156 attached. Either environmental surface fastener holders 128 and/or 132 may be omitted to accommodate first mechanical fastener portion 116 and/or second mechanical fastener portion 118 of adjacent elements 170, respectively.

Figure 3:
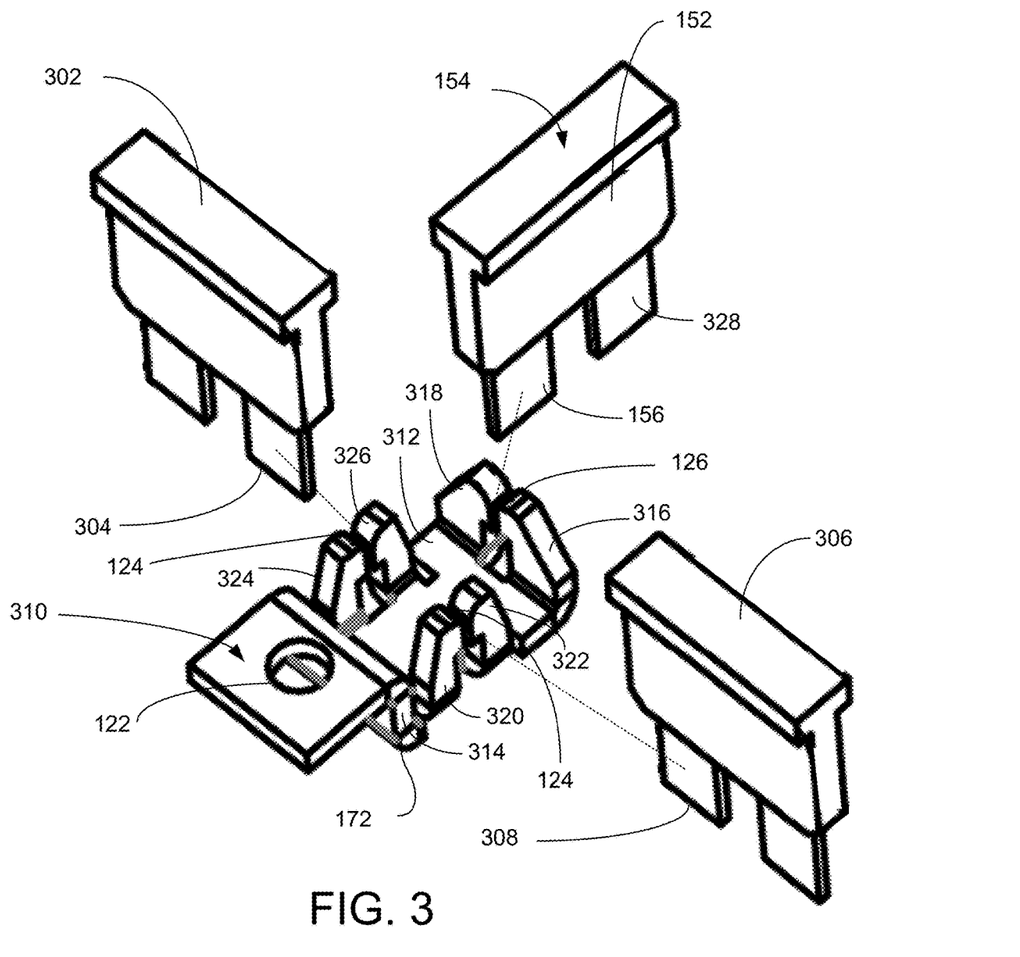
FIG. 3 is a top-front perspective exploded view illustrating an exemplary detail of the exemplary embodiment of the expandable blade-type distribution block of FIG. 2, according to a preferred embodiment of the present invention.

FIG. 3 is a top-front perspective exploded view illustrating an exemplary detail of the exemplary embodiment of the expandable blade-type distribution block 100 of FIG. 2, according to a preferred embodiment of the present invention. FIG. 3 shows connections to the input coupling 172 when two adjacent elements 170 are to be connected to input coupling 172. Exemplary input coupling 172 is one piece of electrically conductive material (preferably, metal) and has a fastener plateau 310 with a fastener receiving portion 122 for connecting input wire 136 to the input coupling 172. Vertical section 314 extends from the fastener plateau to the lower panel 312. Two blade-type crossbar conductor blade receivers 124 and one blade-type fuse blade receiver 126 extend from lower panel 312. Electrically conductive blade 156 of blade-type fuse 152 is to be wedged between opposed resilient prongs 316 and 318 of blade-type fuse blade receiver 126 to make electrical contact with input coupling 172. Electrically conductive blade 308 of blade-type crossbar conductor 306 is to be wedged between opposed resilient prongs 320 and 322 of first blade-type crossbar conductor blade receiver 124 to make electrical contact with input coupling 172. Electrically conductive blade 304 of blade-type crossbar conductor 306 is to be wedged between opposed resilient prongs 324 and 326 of second blade-type crossbar conductor blade receiver 124 to make electrical contact with input coupling 172. Output coupling 120 is similarly arranged as to the fuse blade 328, but would not normally have blade-type crossbar conductors, such as 302 and 306, connected. In order of allow the element to be used in either of two input/output orientations, symmetry of the input and output couplings 172, 120, is preserved. Spacing between the outside edge of blade-type fuse blade receiver 126 and the nearest edge of a blade-type crossbar conductor blade receiver 124 is preferably sufficient to accommodate a fuse blade 156 from a maxi APX heavy duty fuse 152, without interfering with crossbar connector blades 304 and 308. Variation of the prong design, within the functional requirements described above, may be used in various embodiments.

Figure 4:
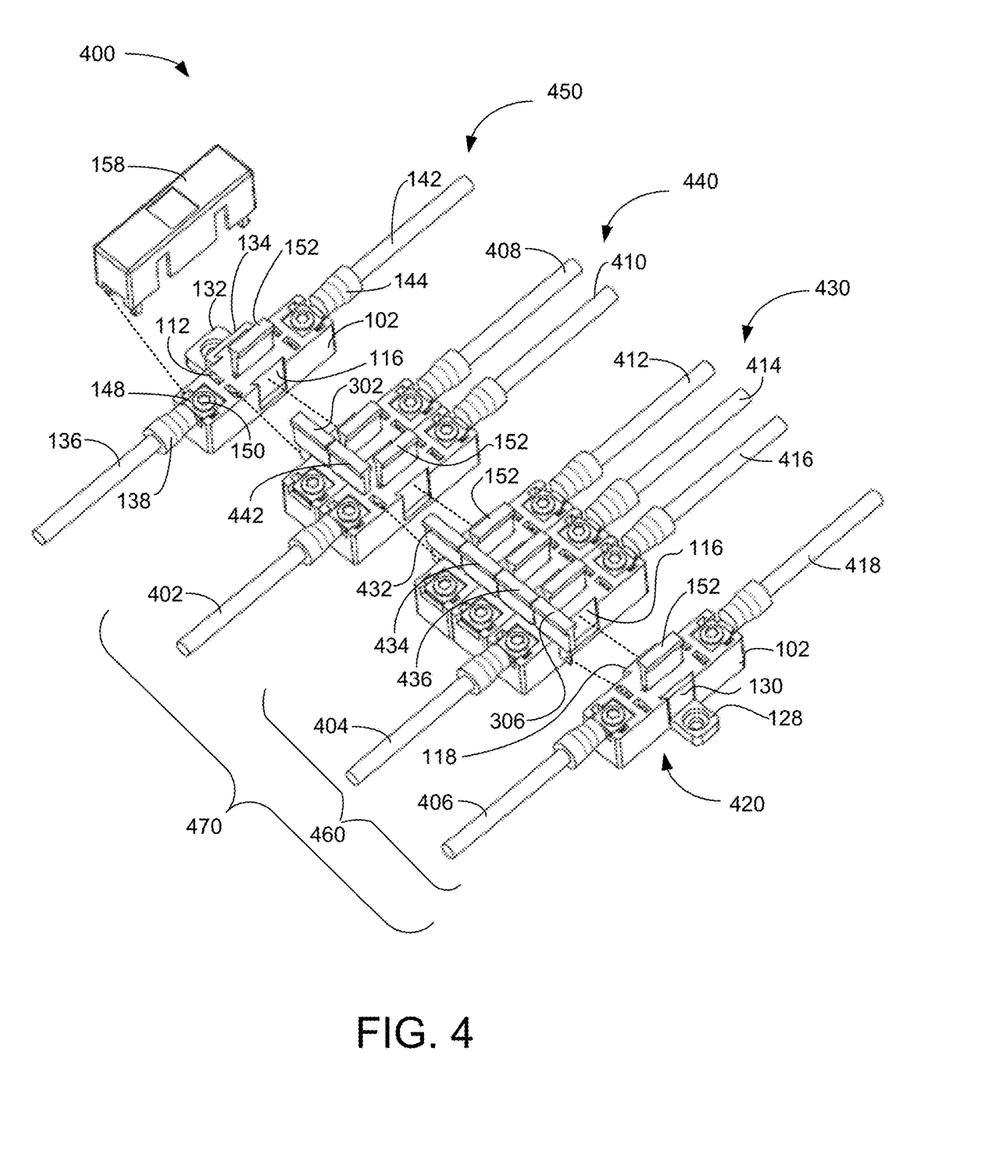
FIG. 4 is a top-front perspective exploded view illustrating multiple exemplary embodiments of the expandable blade-type distribution block, according to preferred embodiments of the present invention.

FIG. 4 is a top-front perspective exploded view illustrating multiple exemplary embodiments 420, 430, 440, and 450 of the expandable blade-type distribution block 100 of FIG. 1, according to preferred embodiments of the present invention. Considered alone, expandable blade-type distribution block 420 is a single element 170 with input and output wires 406 and 418, environmental surface fastener holder 128, and fuse 152 connected in a fused 152 electrical connection between input wire 406 and output wire 418. Expandable blade-type distribution block 420 may have a cap 158 installed. In another embodiment, fuse 152 may be replaced by a crossbar conductor 302 or 306, to make a direct, un-fused, electrical connection between input wire 406 and output wire 418. In another embodiment, environmental surface fastener holder 132 may be installed on expandable blade-type distribution block 420.

Considered alone, expandable blade-type distribution block 430 is a single input 404, three output 412, 414, 416 fused 152 (one of three labeled) expandable blade-type distribution block 430 made up of three elements 170 electrically connected by crossbar conductors 434 and 436 and mechanically connected by first and second mechanical fastener portions 116 and 118. Embodiment 430 has two couplings available for direct un-fused connections to input wire 404. Expandable blade-type distribution block 430 may have one to three caps 158 installed. In another embodiment, one or more fuses 152 may be replaced by a crossbar conductor 302 or 306, to make a direct, un-fused, electrical connection between input wire 404 and output wire 412, 414, and/or 416. In another embodiment, environmental surface fastener holders 128 and 132 may be installed on expandable blade-type distribution block 430. Note that other approaches for making connections are within the scope of the present invention. For non-limiting example, if wire 412 is used as the input, then three fused outputs (404 and the two unused couplings sharing one fuse 152) and two doubly-fused outputs 414 and 416 are available.

Embodiment 430 and 420 may be electrically connected by blade-type crossbar connector 306 and be mechanically connected by first and second mechanical fastener portions 116 and 118 to make expandable blade-type distribution block 460. In expandable blade-type distribution block 460, only one of wires 404 and 406 may be an input, with the other being a direct un-fused output, resulting in a single-input 404, four-fused output 412, 414, 416 and 418, and one direct un-fused output 406 expandable blade-type distribution block 460. In a particular embodiment, the two unused couplings may provide additional direct un-fused outputs. Expandable blade-type distribution block 460 may have one to four caps 158 installed. In another embodiment, one or more fuses 152 may be replaced by a crossbar conductor 302 or 306, to make a direct, un-fused, electrical connection between input wire 404 and output wire 412, 414,416 and/or 418. In another embodiment, environmental surface fastener holder 132 may be installed on expandable blade-type distribution block 460. In an embodiment, expandable blade-type distribution blocks 420 and 430 may be connected mechanically but not electrically, to provide for two different circuits in the same expandable blade-type distribution block.

Expandable blade-type distribution block 440, considered alone, is a single-input 402, two-output 408, 410 expandable blade-type fused 152 (one of two labeled) distribution block 440 made up of two elements 170 electrically connected by blade-type crossbar connector 442 and mechanically connected by mechanical fastener portions 116 and 118. In a particular embodiment, the unused coupling may provide a direct un-fused output. In another embodiment, environmental surface fastener holders 128 and 132 may be installed on expandable blade-type distribution block 440. Expandable blade-type distribution block 440 may have one or two caps 158 installed. Note that other approaches for making connections are within the scope of the present invention. For non-limiting example, if wire 410 is used as the input, then two fused outputs (402 and the unused coupling sharing one fuse 152) and one doubly-fused output 408 are available. In another embodiment, one or more fuses 152 may be replaced by a crossbar conductor 302 or 306, to make a direct, un-fused, electrical connection between input wire 402 and output wires 408 and 410. In another embodiment, environmental surface fastener holders 128 and 132 may be installed on expandable blade-type distribution block 440

Expandable blade-type distribution blocks 440, 430 and 420 may be electrically connected by blade-type crossbar connectors 306 and 432 and be mechanically connected by first and second mechanical fastener portions 116 and 118 to make expandable blade-type distribution block 470. Only one (and any one) wire of three possible input wires 406, 404, and 402 may be an input wire, with the remaining two being direct un-fused outputs connected to the input. Accordingly, expandable blade-type distribution block 470 has a single-input 406; six-fused-outputs 408, 410, 412, 414, 416, and 418; and two direct un-fused outputs 402 and 404. In a particular embodiment, the three unused couplings may provide a direct un-fused output. In another embodiment, environmental surface fastener holder 132 may be installed on expandable blade-type distribution block 470. Expandable blade-type distribution block 470 may have one to six caps 158 installed. Note that other approaches for making connections are within the scope of the present invention. For non-limiting example, if wire 414 is used as the input, then six fused outputs (402, 404, 406 and the four unused couplings sharing one fuse 152) and five doubly-fused outputs 408, 410, 412, 416 and 418 are available. In another embodiment, one or more fuses 152 may be replaced by a crossbar conductor 302 or 306, to make a direct, un-fused, electrical connection between input wire 406 and output wires 408, 410, 412, 414, 416, and/or 418. In another embodiment, environmental surface fastener holder 132 may be installed on expandable blade-type distribution block 470.

Considered alone, expandable blade-type distribution block 450 is a single element 170 with input and output wires 136 and 142, environmental surface fastener holder 138, and fuse 152 connected in a fused 152 electrical connection between input wire 136 and output wire 142. Expandable blade-type distribution block 450 may have a cap 158 installed. In another embodiment, fuse 152 may be replaced by a crossbar conductor 302 or 306, to make a direct, un-fused, electrical connection between input wire 136 and output wire 142. In another embodiment, environmental surface fastener holder 128 may be installed on expandable blade-type distribution block 450.

Expandable blade-type distribution blocks 450, 440, 430 and 420 may be electrically connected by blade-type crossbar connectors 306 and 432 and be mechanically connected by first and second mechanical fastener portions 116 and 118 to make expandable blade-type distribution block 400. Only one (and any one) wire of four possible input wires 136, 406, 404, and 402 may be an input wire, with the remaining three being direct un-fused outputs connected to the input. Accordingly, expandable blade-type distribution block 400 has a single-input 406; seven-fused-outputs 142, 408, 410, 412, 414, 416, and 418; and three direct un-fused outputs 136, 402, and 404. In a particular embodiment, the three unused couplings may provide a direct un-fused output. Expandable blade-type distribution block 400 may have one to seven caps 158 installed. Note that other approaches for making connections are within the scope of the present invention. For non-limiting example, if wire 414 is used as the input, then seven single-fused outputs (136, 402, 404, 406 and the three unused couplings sharing one fuse 152) and six doubly-fused outputs 142, 408, 410, 412, 416 and 418 are available. In another embodiment, one or more fuses 152 may be replaced by a crossbar conductor 302 or 306, to make a direct, un-fused, electrical connection between input wire 406 and output wires 408, 410, 412, 414, 416, and/or 418.

In a particular embodiment, expandable blade-type distribution blocks 450, 440, 430 and 420 may be mechanically connected but not electrically connected, thereby providing a single distribution block for four distinct circuits. The examples of FIG. 4 are provided to merely exemplify the wide variety of possible expandable blade-type distribution block configurations. The present invention is not limited in the number of elements 170 that may be connected, nor the number of circuits that may be supported in a single distribution block.

Figure 5:
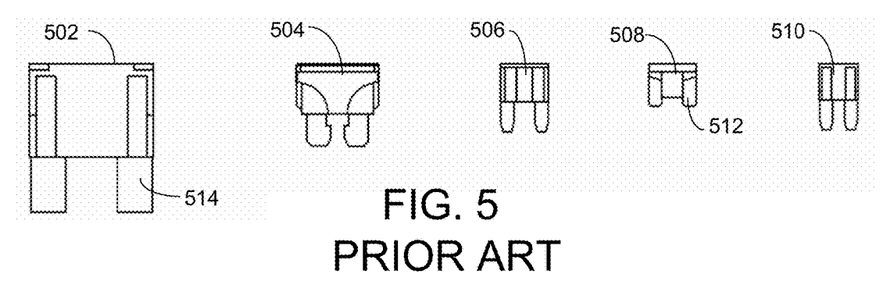
FIG. 5 is a front elevation view illustrating multiple prior art fuses to be used in embodiments of the expandable blade-type distribution block 100 of FIG. 1, according to preferred embodiments of the present invention.

FIG. 5 is a front elevation view illustrating multiple prior art fuses 502, 504, 506, 508, and 510 to be used in embodiments of the expandable blade-type distribution block 100 of FIG. 1, according to preferred embodiments of the present invention. Maxi APX heavy duty blade fuse 502, regular APR/ATC/ATO/ATS blade fuse 504, mini APM/ATM blade fuse 506, low profile mini APS blade fuse 508, and micro2 blade fuse 510 are shown. Low-profile mini Applicants' blade fuses require that the blade-type fuse blade receiver 126 extend into the fuse blade openings 114 to ensure contact by the short blades of micro2 blade fuse 510. The length of blades 514 of maxi APX heavy duty blade fuse 502 determines the required depth of the blade-type fuse blade receiver 126.

Figure 6:
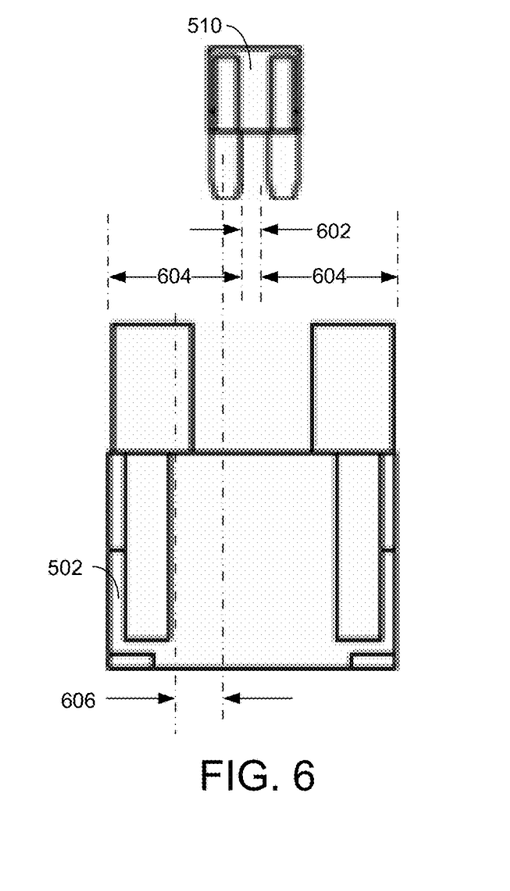
FIG. 6 is a diagrammatic view illustrating dimensional details of embodiments of the expandable blade-type distribution block 100 of FIG. 1, according to preferred embodiments of the present invention.

FIG. 6 is a diagrammatic view illustrating dimensional details of embodiments of the expandable blade-type distribution block 100 of FIG. 1, according to preferred embodiments of the present invention. Fuse blade openings 114 must be separated by no more than gap 602, or micro2 blade fuse 510 will not fit. Fuse blade openings 114 must be at least as long as extent 604, or maxi APX heavy duty blade fuse 502 will not fit. Blade-type fuse blade receiver 126 must have a dimension along the long axis of input coupling 172 at least as long as dimension 606, or either the micro2 blade fuse 510 or the maxi APX heavy duty blade fuse 502 will not make sufficient contact when installed.

We claim:

1. An expandable blade-type distribution block for distributing electrical power though direct connections or fused connections, comprising an element of the expandable blade-type distribution block further comprising:
   a. a generally rectangular electrically non-conductive base having first and second opposed long sides;
   b. at least one first portion of a mechanical connector formed in, and of one piece with, said first long side of said base;
   c. at least one second portion of said mechanical connector formed in, and of one piece with, said second long side of said base; and
   d. wherein said first and second portions of said mechanical connector are complimentary and mutually engageable between first and second adjacent said bases.

2. The expandable blade-type distribution block of claim 1, comprising:
   a. an input coupling attached to said base at a first end of said base; and
   b. an output coupling attached to said base at a second opposing end of said base;
   c. wherein each said coupling comprises:
      i. entirely one piece of electrically conductive material;
      ii. a blade-type fuse blade receiver extending upward from a lower panel;
      iii. first and second blade-type crossbar conductor blade receivers extending upward from said lower panel;
      iv. a vertical portion extending upward from said lower panel;
      v. a horizontal fastener plateau extending from said vertical portion; and
      vi. a fastener receiver portion within said plateau.

3. The expandable blade-type distribution block of claim 2, comprising:
   a. a top panel of said base;
   b. input and output openings in said top panel at opposing ends of said base, said input and output openings adapted to provide access to said input coupling plateau and said output coupling plateau, respectively;
   c. first and second crossbar openings in said top panel adapted to provide access to said first and second blade-type crossbar conductor blade receivers of said input coupling;
   d. third and fourth crossbar openings in said top panel adapted to provide access to said first and second blade-type crossbar conductor blade receivers of said output coupling;
   e. first and second fuse blade openings adapted to provide access to said blade-type fuse blade receiver of said input coupling and said fuse blade receiver of said output coupling, respectively.

4. The expandable blade-type distribution block of claim 3, wherein said first and second fuse blade openings:
   a. are spaced apart sufficiently close to receive first and second blades of a micro2 flat blade type fuse; and
   b. have a length sufficient to receive first and second blades of a maxi APX heavy duty fuse.

5. The expandable blade-type distribution block of claim 3, comprising:
   a. a first environmental surface fastener holder adapted to connect to said at least one first portion of a mechanical connector; and
   b. a second environmental surface fastener holder adapted to connect to said at least one second portion of a mechanical connector.

6. The expandable blade-type distribution block of claim 2, comprising:
   a. a generally rectangular electrically non-conductive snap-fit cap adapted to snap fit to said base without preventing mechanical connection of two adjacent mechanically connected said bases;
   b. a window in a top panel of said snap-fit cap;
   c. first and second crossbar openings on each of first and second long sides of said snap-fit cap;
   d. first and second end notches at first and second opposed ends of said base; and
   e. first and second snap-fit connectors each on opposed sides of first and second opposed ends of said base.

7. The expandable blade-type distribution block of claim 2, comprising at least two said elements mechanically connected adjacently using respective said first and second mechanical connector portions.

8. The expandable blade-type distribution block of claim 7, comprising a width of said base adapted to:
   a. space apart said first and second crossbar openings of adjacent said mechanically connected elements to a spacing that is adapted to receive first and second blades of a blade-type crossbar conductor; and
   b. space apart said third and fourth crossbar openings of adjacent said mechanically connected elements to a spacing that is adapted to receive first and second blades of a blade-type crossbar conductor.

9. The expandable blade-type distribution block of claim 3, comprising:

a. one of an input and an output wire attached to a wire connector that is adapted to be received around said fastener receiver portion within said plateau of one of said input coupling and said output coupling;
b. a washer adapted to be received on said wire connector;
c. a fastener adapted to be received through said washer, said wire connector, and said fastener receiver portion to fasten said wire connector to said fastener plateau.

10. The expandable blade-type distribution block of claim 9, wherein said at least two said elements mechanically connected adjacently using said first and second mechanical connector portions comprises at least two of:
a. said blade-type fuse installed in said blade-type fuse blade receivers of opposing input and output couplings in one said element of said at least two elements;
b. said blade-type crossbar conductor installed in said first and second blade-type crossbar conductor blade receivers of said input couplings in adjacent mechanically connected first and second elements of said at least two elements; and
c. said blade-type crossbar conductor installed in said blade-type fuse blade receivers of opposing input and output couplings in one said element of said at least two elements.

11. The expandable blade-type distribution block of claim 9, wherein said at least two said mechanically connected adjacent elements using said first and second mechanical connector portions comprises at least one of:
a. at least two elements that are not electrically connected;
b. at least two elements that are electrically connected;
c. at least two elements that are mechanically connected by at least one dovetail joint;
d. at least two elements that are mechanically connected by more than one dovetail joint;
e. at least one environmental surface fastener holder;
f. at least one wire fastened to one of said input coupling and said output coupling; and
g. at least one snap-fit cap.

12. An expandable blade-type distribution block for distributing electrical power though direct connections or fused connections, comprising an element of the expandable blade-type distribution block further comprising:
a. a generally rectangular electrically non-conductive base having first and second opposed long sides;
b. at least one first portion of a mechanical connector formed in and of one piece with said first long side of said base;
c. at least one second portion of said mechanical connector formed in and of one piece with said second long side of said base;
d. wherein said first and second portions of said mechanical connector are complimentary and mutually engageable between first and second adjacent said bases;
e. a first environmental surface fastener holder adapted to connect to said at least one first portion of a mechanical connector; and
f. a second environmental surface fastener holder adapted to connect to said at least one second portion of a mechanical connector.

13. The expandable blade-type distribution block of claim 12, comprising:
a. an input coupling attached to said base at a first end of said base; and
b. an output coupling attached to said base at a second opposing end of said base;
c. wherein each said coupling comprises:
  i. entirely one piece of electrically conductive material;
  ii. a blade-type fuse blade receiver extending upward from a lower panel;
  iii. first and second blade-type crossbar conductor blade receivers extending upward from said lower panel;
  iv. a vertical portion extending upward from said lower panel;
  v. a horizontal fastener plateau extending from said vertical portion; and
  vi. a fastener receiver portion within said plateau.

14. The expandable blade-type distribution block of claim 13, comprising:
a. a top panel of said base;
b. input and output openings in said top panel at opposing ends of said base, said input and output openings adapted to provide access to said input coupling plateau and said output coupling plateau, respectively;
c. first and second crossbar openings in said top panel adapted to provide access to said first and second blade-type crossbar conductor blade receivers of said input coupling;
d. third and fourth crossbar openings in said top panel adapted to provide access to said first and second blade-type crossbar conductor blade receivers of said output coupling;
e. first and second fuse blade openings adapted to provide access to said blade-type fuse blade receiver of said input coupling and said fuse blade receiver of said output coupling, respectively;
f. wherein said first and second fuse blade openings:
  i. are spaced apart sufficiently close to receive first and second blades of a micro2 flat blade type fuse; and
  ii. have a length sufficient to receive first and second blades of a maxi APX heavy duty fuse.

15. The expandable blade-type distribution block of claim 14, comprising:
a. a generally rectangular electrically non-conductive snap-fit cap adapted to snap fit to said base without preventing mechanical connection of two adjacent mechanically connected said bases;
b. a window in a top panel of said snap-fit cap;
c. first and second crossbar openings on each of first and second long sides of said snap-fit cap;
d. first and second end notches at first and second opposed ends of said base; and
e. first and second snap-fit connectors each on opposed sides of first and second opposed ends of said base; and
f. a width of said base adapted to:
  i. space apart said first and second crossbar openings of adjacent said mechanically connected elements to a spacing that is adapted to receive first and second blades of a blade-type crossbar conductor; and
  ii. space apart said third and fourth crossbar openings of adjacent said mechanically connected elements to a spacing that is adapted to receive first and second blades of a blade-type crossbar conductor.

16. The expandable blade-type distribution block of claim 15, comprising:
a. at least two said elements mechanically connected adjacently using respective said first and second mechanical connector portions;
b. at least one of:
  i. at least two elements that are not electrically connected;
  ii. at least two elements that are electrically connected;
  iii. at least two elements that are mechanically connected by at least one dovetail joint;

iv. at least two elements that are mechanically connected by more than one dovetail joint;
v. at least one environmental surface fastener holder;
vi. at least one wire fastened to one of said input coupling and said output coupling; and
vii. at least one snap-fit cap; and
c. at least two of:
i. said blade-type fuse installed in said blade-type fuse blade receivers of opposing input and output couplings in one said element of said at least two elements;
ii. said blade-type crossbar conductor installed in said first and second blade-type crossbar conductor blade receivers of said input couplings in adjacent mechanically connected first and second elements of said at least two elements; and
iii. said blade-type crossbar conductor installed in said blade-type fuse blade receivers of opposing input and output couplings in one said element of said at least two elements.

17. An expandable blade-type distribution block for distributing electrical power though direct connections or fused connections, comprising an element of the expandable blade-type distribution block further comprising:
a. a generally rectangular electrically non-conductive base having first and second opposed long sides;
b. at least one first portion of a mechanical connector formed in and of one piece with said first long side of said base;
c. at least one second portion of said mechanical connector formed in and of one piece with said second long side of said base;
d. wherein said first and second portions of said mechanical connector are complimentary and mutually engageable between first and second adjacent said bases;
e. a first environmental surface fastener holder adapted to connect to said at least one first portion of a mechanical connector;
f. a second environmental surface fastener holder adapted to connect to said at least one second portion of a mechanical connector;
g. an input coupling attached to said base at a first end of said base; and
h. an output coupling attached to said base at a second opposing end of said base;
i. wherein each said coupling comprises:
i. entirely one piece of electrically conductive material;
ii. a blade-type fuse blade receiver extending upward from a lower panel;
iii. first and second blade-type crossbar conductor blade receivers extending upward from said lower panel;
iv. a vertical portion extending upward from said lower panel;
v. a horizontal fastener plateau extending from said vertical portion; and
vi. a fastener receiver portion within said plateau.

18. The expandable blade-type distribution block of claim 17, comprising:
a. a top panel of said base;
b. input and output openings in said top panel at opposing ends of said base, said input and output openings adapted to provide access to said input coupling plateau and said output coupling plateau, respectively;
c. first and second crossbar openings in said top panel adapted to provide access to said first and second blade-type crossbar conductor blade receivers of said input coupling;
d. third and fourth crossbar openings in said top panel adapted to provide access to said first and second blade-type crossbar conductor blade receivers of said output coupling;
e. first and second fuse blade openings adapted to provide access to said blade-type fuse blade receiver of said input coupling and said fuse blade receiver of said output coupling, respectively;
f. wherein said first and second fuse blade openings:
i. are spaced apart sufficiently close to receive first and second blades of a micro2 flat blade type fuse; and
ii. have a length sufficient to receive first and second blades of a maxi APX heavy duty fuse.

19. The expandable blade-type distribution block of claim 18, comprising:
a. at least two said elements mechanically connected adjacently using respective said first and second mechanical connector portions;
b. at least one of:
i. at least two elements that are not electrically connected;
ii. at least two elements that are electrically connected;
iii. at least two elements that are mechanically connected by at least one dovetail joint;
iv. at least two elements that are mechanically connected by more than one dovetail joint;
v. at least one environmental surface fastener holder;
vi. at least one wire fastened to one of said input coupling and said output coupling; and
vii. at least one snap-fit cap; and
c. at least two of:
i. said blade-type fuse installed in said blade-type fuse blade receivers of opposing input and output couplings in one said element of said at least two elements;
ii. said blade-type crossbar conductor installed in said first and second blade-type crossbar conductor blade receivers of said input couplings in adjacent mechanically connected first and second elements of said at least two elements; and
iii. said blade-type crossbar conductor installed in said blade-type fuse blade receivers of opposing input and output couplings in one said element of said at least two elements.

20. The expandable blade-type distribution block of claim 19, comprising:
a. a generally rectangular electrically non-conductive snap-fit cap adapted to snap fit to said base without preventing mechanical connection of two adjacent mechanically connected said bases;
b. a window in a top panel of said snap-fit cap;
c. first and second crossbar openings on each of first and second long sides of said snap-fit cap;
d. first and second end notches at first and second opposed ends of said base; and
e. first and second snap-fit connectors each on opposed sides of first and second opposed ends of said base;
f. a width of said base adapted to:
i. space apart said first and second crossbar openings of adjacent said mechanically connected elements to a spacing that is adapted to receive first and second blades of a blade-type crossbar conductor; and
ii. space apart said third and fourth crossbar openings of adjacent said mechanically connected elements to a spacing that is adapted to receive first and second blades of a blade-type crossbar conductor.

\* \* \* \* \*